Figures 1, 2:
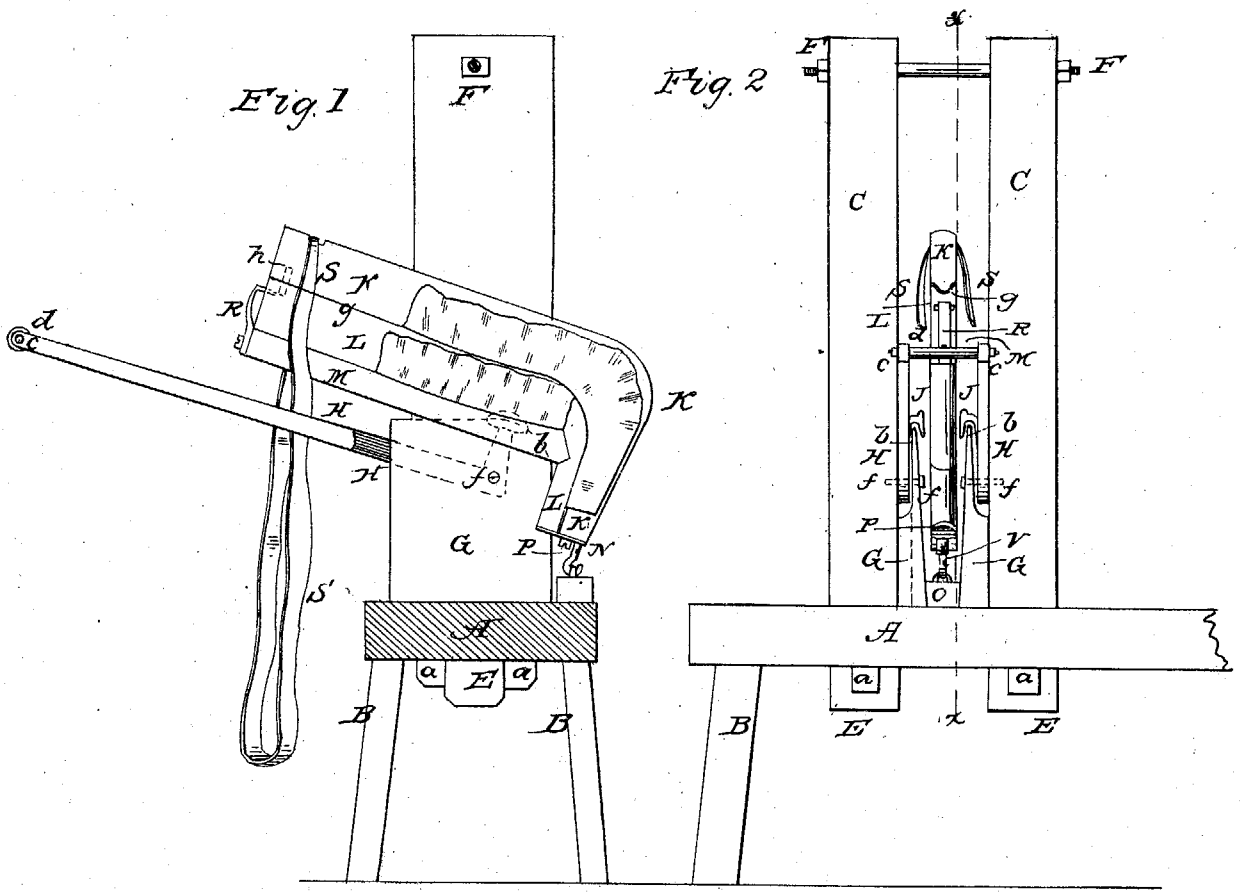

1658X

N. L. MOORE.

Crimping Leather.

Patented Feb. 4, 1812.

N. PETERS, Photo-Lithographer, Washington, D. C.

[illegible]

Nathaniel L. Moore 1658X

Letters Patent

The Schedule referred to in these Letters Patent and making part of the same containing a description in the words of the said Nathaniel L. Moore himself of his machine for cramping Boot Legs This machine consists of the bench, upright binders, side boards and boot trees. The Bench is a horizontal block or board of such dimensions as is convenient. It rests on four feet, which raise it any required height from the floor, and it supports the other machinery. The upright binders are two vertical posts which rise from the Bench having their lower extremities fixed into it by tenons, or the tenons may go through the bench and be secured underneath by pins or wedges. They stand so far apart as to allow the side boards and rubbers, as also the boot trees to be placed between them. The number of these binders to be increased if more rubbers and boot trees than one set are on the same bench; so that one set of boot trees, rubbers and side boards may be between two upright binders. These upright binders are kept in their proper position by horizontal screws which connect the upper ends, and which regulate their distance according to the thickness of the leather on the trees. Between these binders and attached thereto are two side pieces so far apart as to take the boot tree and leather when cramped between them. They rest on the bench having their further ends reaching to the back edge of the upright binders. The upper edge of the further end is formed into the arc of a circle the thickness of the board being there so reduced as to admit one of the rubbers between it and the upright binder on each side; the inner edge of the rubber passing along this circular part of the side board, and [illegible] the Boot tree The rubber is composed of two parallel arms or levers connected at their extremity so as to work together and form the handle by which it is moved; it turns between the side boards and binders on pivots which extend into them. at the end of the arms where these pivots are is placed two rubbers which rise from them and reach above the circular part of the side boards there extending inwards to the inner edge of the side boards. The upper ends of these rubbers are formed to a semicircle and they press up the leather
on each side of the Boot tree, gathering so as to form or cramp the leather
into the proper shape for Boot making. The Boot tree is composed of
three parts. the Boot tree proper the first binder which has the same
curve as the tree and has a groove along it which receives the edge of the
tree and the second binder that forms the back of the Boot leg upon
the first binder in the same manner that the first binder confines
the front of the Boot leg to the tree. At the lower extremity of
the tree is a projecting hook which is fixed into a staple on the head
of the post rising from the bench behind the upright binders, and
which staple serves as a fulcrum when the tree is pressed down be
tween the side boards, and the operation of rubbing is performed.
A plate of metal and screw extending forwards from the end of the
tree the hook above mentioned is fixed supports the end of the first bind
by a projecting pin or other fastening rising from the binder to the tree
er of the tree whilst the other end of [illegible] is held up to the tree, the un
der or second binder has one end that goes into the notch in the first
binder and is held to it at the other end by a spring catch of wood
or iron. Or these binders and the tree may be fastened to each other
when the leather is between them, in any other manner, as by belts.
pins, staples &c. In using this machine the leather which
forms the front of the boot is placed between the Boot tree and the first
binder the instep being when the tree turns downwards, and that
part of the leather which forms the back of the Boot, between the first
and second binders above described the leather may be single or doub
le at the pleasure of the person using the machine. The hook at
the lower end of the tree, is then introduced into the staple on the post
and ~~and~~ the opposite end of the tree drawn downwards by a strap
with the foot or in any other manner, and as this downward pressure
is given the handle of the rubber is raised and lowered so that the motion
of the rubbers in the arc of the circle over the side boards forces and gathers
the leather to the tree, at the instep with little labor and in a few minutes
and as the tree passes down between the side boards it completes the opera
tion of cramping the leather Nath L Moore Witnesses present – William Thornton
Geo Lyon (Patented Feb. 14th [illegible])

[illegible] [illegible]

Drawing made A.A.V.S 1844